Oct. 22, 1929.   P. A. JOHNSON   1,732,517
TRACTOR RIM
Filed Aug. 11, 1928   2 Sheets-Sheet 1

Peter A. Johnson, Inventor
By C.A. Snow & Co.
Attorneys

Oct. 22, 1929.　　　P. A. JOHNSON　　　1,732,517
TRACTOR RIM
Filed Aug. 11, 1928　　2 Sheets-Sheet 2

Peter A. Johnson, Inventor
By C. A. Snow & Co.
Attorneys

Patented Oct. 22, 1929

1,732,517

UNITED STATES PATENT OFFICE

PETER A. JOHNSON, OF STOUGHTON, WISCONSIN, ASSIGNOR OF ONE-HALF TO HENRY NORRIS KLONGLAND, OF STOUGHTON, WISCONSIN

TRACTOR RIM

Application filed August 11, 1928. Serial No. 299,031.

This invention aims to provide a novel means for attaching an auxiliary rim to the main rim of a tractor wheel, thereby to broaden the rim and increase the efficiency thereof.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:—

Figure 1:
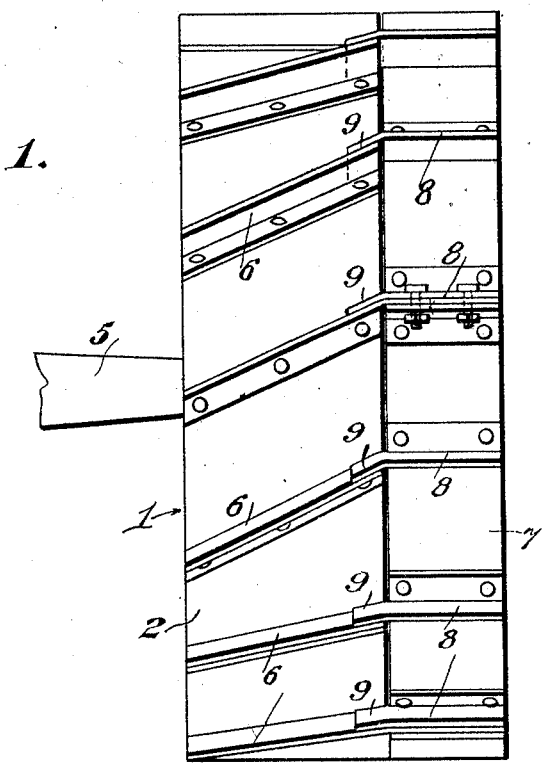
Figure 1 shows in plan, a wheel to which has been attached the device forming the subject matter of this application.

Referring to the form shown in Figures 1 to 4, there appears a main tractor wheel 1 including a rim 2 having an inwardly extended flange 3, the spokes being shown at 4, and the axle of the wheel appearing at 5. The rim 2 has traction cleats 6 which are disposed acutely to the draft line. The numeral 7 designates an auxiliary rim having cleats 8, the ends of which are inclined as shown at 9, to engage with the ends of the cleats 6 on the rim of the main wheel.

Figure 4:
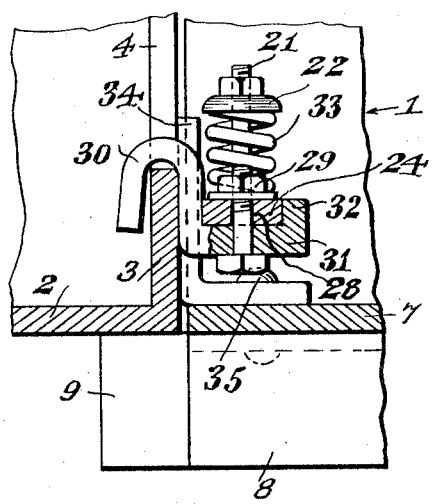
Figure 4 is a section on the line 4—4 of Figure 3.
Figure 5:
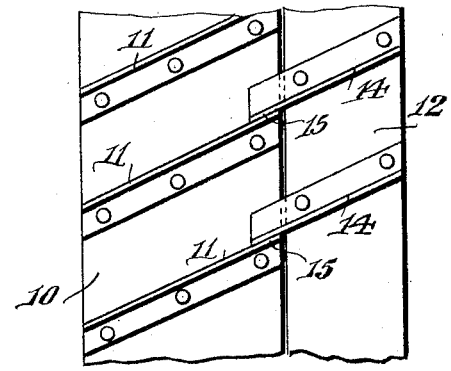
Figures 5 and 6 are plan views illustrating modifications.
Figure 6:
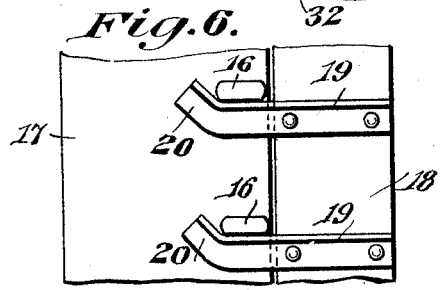

It is not necessary, however, that the ends 9 of the cleats 8 be inclined, as shown in Figure 1. Thus, in Figure 5, the rim of the main wheel is shown at 10 and the cleats at 11. The auxiliary rim appears at 12, and its cleats 14 are straight, the cleats 14 extending beyond the rim 12, and overlapping the cleats 11 on the rim 10, as shown at 15. Sometimes the cleats on the main rim may be mere lugs, as shown in Figure 6. In that figure, the cleats appear at 16 and the main rim is designated by the numeral 17. The auxiliary rim is marked by the numeral 18 and has cleats 19, the ends 20 of which are inclined, and engaged with the lugs or cleats 16. In general, the cleats on the auxiliary rim are constructed in any desired way, so that they will cooperate with the cleats on the main rim. As indicated in Figure 4, for instance, the auxiliary rim 7 is disposed in the same plane with the main rim 2.

Securing elements 21, such as bolts, are arranged at oppositely disposed points on the auxiliary rim 7. There may be as many of these securing elements 21, and parts carried thereby, as the manufacturer considers expedient. On the inner end of each securing element 21 there is a head 22, which may be a washer held in place by the nut 23 on the bolt.

Figure 2:
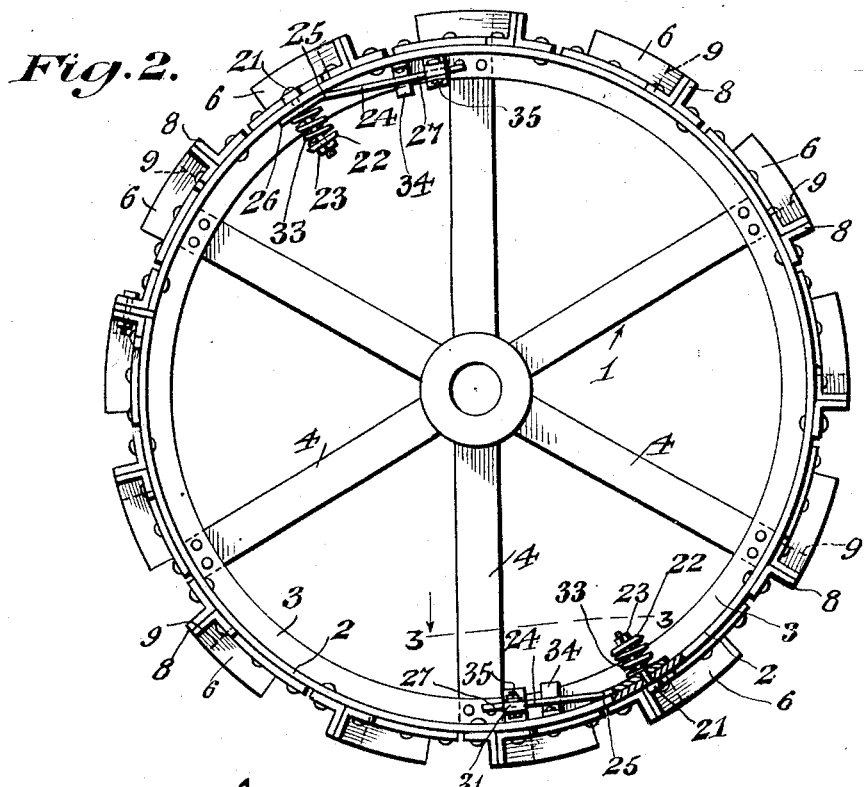
Figure 2 is a side elevation.

An arm 24 is mounted on the securing element 21, the arm 24 being in the form of a rigid strap, having an angle 25 intermediate its ends, the construction being such that one end 26 of the arm will rest against the inner surface of the auxiliary rim 7, whereas the opposite end 27 of the arm will incline away from the auxiliary rim, as clearly shown in Figure 2 of the drawings.

In the end 27 of the arm 24 there is a slot 28 which is elongated circumferentially of the wheel. In the slot 28 is disposed a securing element 29, such as a nut and bolt, shown clearly in Figure 4 of the drawings. The numeral 30 designates a hook-shaped bracket engaged with the flange 3 of the main rim 2. The bracket 30 has a base 31, through which the securing element 29 passes, and the base 31 is provided at its inner end with a rectangularly disposed flange 32 which is parallel to the inner part of the hook 30, as shown in Figure 4 of the drawings. The end 27 of the arm 24 fits closely between the inner part of the bracket 30 and the flange 32 as shown in Figure 4 of the drawings.

Figure 3:
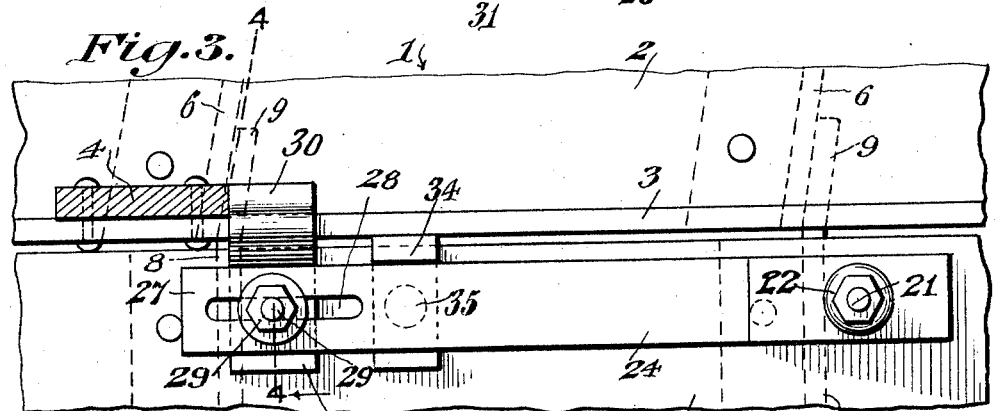
Figure 3 is a section on the line 3—3 of Figure 2.

In practical operation, the securing element 29 is slid in the slot 28 until the bracket 30 is up against one side of one of the spokes 4, as shown in Figure 3.

Then the securing element 29 is tightened up. This operation aids in holding the auxiliary rim 7 in place against circumferential movement, especially when the tractor wheel is reversely rotated. Because the ends 9 of the cleats 8 on the auxiliary rim overlap the ends of the cleats 6 on the main rim 2, the rims are connected securely for simultaneous rotation, and the effective width of the track wheel is broadened to its obvious advantage.

A compression spring 33 is mounted on the securing element 21 between the head 22 and the part 26 of the arm 24. The function of the spring 33 is to hold down the end 26 of the arm 24 on the rim 7, and to cause the inclined end 27 on the rim 7 to bear on the base 31 of the bracket 30 and keep the bracket engaged with the flange 3 of the rim 2 on the main wheel 1, as shown in Figure 1 of the drawings, it being obvious that when the hook shaped brackets 30 are engaged with the flange 3, the auxiliary rim will be held on the main rim against lateral separation.

An angle member 34 is secured at 35 to the arm 24, and is rotated between the securing elements 21 and 29. One end of the angle member 34 extends between the inner edge of the arm 24 and the flange 3, to serve as a spacer and reinforcement.

Having thus described the invention, what is claimed is:—

1. In a device of the class described, an auxiliary rim, a hook shaped bracket projecting laterally beyond the auxiliary rim, and spring means for forcing the bracket toward the auxiliary rim, thereby to cause the bracket to engage with a main rim and to keep the auxiliary rim assembled with the main rim.

2. In a device of the class described, an auxiliary rim, an arm extended longitudinally of the rim, a member carried by the arm for engaging a main rim, and spring means for operating the arm to cause said member to engage with a main rim.

3. In a device of the class described, an auxiliary rim, an arm extended longitudinally of the auxiliary rim, a coupling bracket, means for mounting the bracket on the arm for adjustment longitudinally of the arm, and spring means for holding the arm yieldingly on the auxiliary member.

In testimony that I claim the foregoing as my own, I have hereto affixed my signature.

PETER A. JOHNSON.